Figure 1:
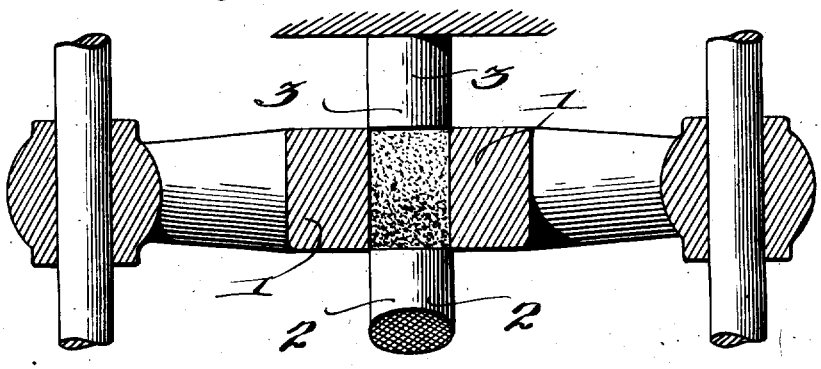

No. 12,643 REISSUED APR. 30, 1907.

A. RÓNAY.

METHOD OF FORMING BLOCKS OF ORES FOR METALLURGICAL PURPOSES.

APPLICATION FILED JAN. 14, 1907.

Witnesses
Robert H. Ashley
Walter A. Pauli

Inventor
Árpád Rónay
By his Attorneys Chipford & Pulle

UNITED STATES PATENT OFFICE.

ÁRPÁD RÓNAY, OF BUDAPEST, AUSTRIA-HUNGARY.

METHOD OF FORMING BLOCKS OF ORES FOR METALLURGICAL PURPOSES.

No. 12,643. Specification of Reissued Letters Patent. Reissued April 30, 1907.

Original No. 778,899, dated January 3, 1905. Application for reissue filed January 14, 1907. Serial No. 352,320.

*To all whom it may concern:*

Be it known that I, ÁRPÁD RÓNAY, director, of 95 Váczi-ut, Budapest, in the Empire of Austria-Hungary, have invented a new and useful Method of Forming Blocks of Ores for Metallurgical Purposes, of which the following is a specification.

This invention relates to a method by means of which ores, minerals, and the like capable of, but owing to their pulverulent or finely-granulous nature not immediately suitable for metallurgical treatment, may be made suitable for such treatment. Hitherto attempts have been made to effect this (see, for example, the German Patent No. 119,810 and the British Patent No. 4,696 of 1901) by pressing the finely-granulous ores or the like into blocks with or without binding media, the latter being the course adopted in the patents just referred to, and exposing the blocks for a time (from twelve to twenty-four hours, at the least) to the action of escaping combustion products containing a large quantity of carbon, so as to produce a resistant-crust, consisting of carbonates, and imparting the necessary firmness to the blocks. Before being exposed to the action of the escaping combustion products the blocks produced in accordance with the above-mentioned British specification must undergo an artificial drying process for the purpose of evaporating the large quantity of moisture which has to be added to the pulverulent material before the operation of pressing the material into blocks is carried out.

By the present method the two last-named operations, which are troublesome and take up much time, are considerably shortened, the preliminary damping of the material being entirely avoided, and by means of very powerful pressure applied in a particular manner and unknown hitherto in connection with this purpose blocks produced from the atmospherically-dried material, which as regards the principal object—viz., firmness—far surpass anything of the kind previously produced without the necessity for the material being exposed for from twelve to twenty-four hours to the action of combustion-gases.

The method consists in subjecting the material, which is in an atmospherically-dried condition or in certain cases only very slightly moistened, to very powerful pressure, which only in the rarest cases is less than eight hundred atmospheres and generally reaches two thousand atmospheres or more, the principal feature in conjunction with this exceptionally high pressure being the continuous or intermittent increase as distinguished from a single application of the pressure, which only in the last stage reaches the height at which the material becomes plastic and binds.

Figure 2:
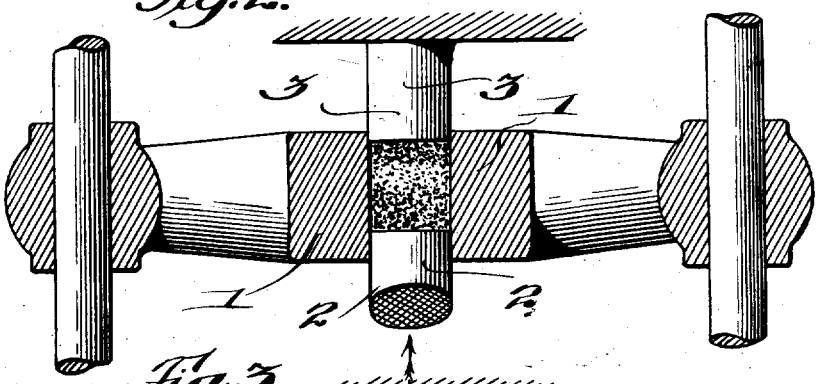
Figure 3:
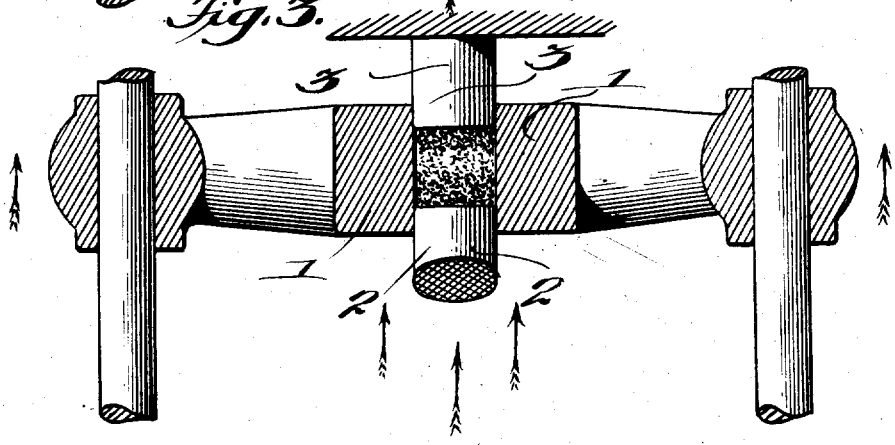

The manner in which the high pressure is applied in the present case has to be described with the understanding that it is known through the German Patent No. 113,215 as being employed in the production of bricks, tiles, and similar objects which are intended for other purposes than those of metallurgy. In connection wherewith, however, it must be observed that while for such purposes, owing to the nature of the materials, (clay and the like,) which become plastic and bind under slight pressure, the pressure is relatively slight. In the present case the pressure must be incomparably higher, as the materials to be pressed (ores, ore-dust, minerals, &c.) have not the property of becoming plastic under relatively slight pressure like the clay and other earthy substances treated under the former process, and the different particles, often of a crystalline nature, only unite under exceedingly high pressure, besides which the particular manner of applying high pressure for forming blocks has not been previously known. The necessity of applying such high pressure in the particular manner was discovered through a series of experiments, all of which showed that the reason for the slight degree of firmness of the blocks produced according to the German Patent No. 113,215 lies in the material, which is considerably moistened, becoming plastic very quickly in the pressing process, owing to the sudden application of the pressure, the air contained in the material being unable to escape and air-bubbles forming which impair the solidity of the block. In view of this latter circumstance the materials made into blocks under the present process are pressed in as dry a state as possible, generally only with their natural moisture, and in any case only very slightly moistened. Hereby not only are the particles of the material brought into extremely close contact, but as a natural consequence the blocks are as far as possible free from air, which is impossible when materials are pressed which, owing to the moisture they contain, are adhesive or plastic under low pressure. On the contrary, with material which is not plastic and, as stated above, acquires sufficient plasticity for binding purposes only in the last stage of compression, the air can escape from all parts of the blocks up to the last moment. This new effect requires that the pressing operation already referred to as being known in connection with other objects should be carried out, in a special manner as illustrated in Figures 1, 2, and 3 of the accompanying drawings.

Fig. 1 is a diagram showing the pressing-mold filled and closed, respectively, by the upper pressing-stamp and the lower counter-stamp. Fig. 2 shows the lower pressing-stamp pressing one side of the material; Fig. 3, the mold pushed onto the counter-stamp during the extreme final pressure and containing the block uniformly compressed and formed entirely free from air.

1 1 represent the mold sliding alone automatically or in some other way with the pressing-stamp 2 in guides, under which arrangement the mold actuated with the pressing-stamp 2 can be pushed at any desired stage of the pressing operation onto the counter-stamp 3, whereby precisely equal pressure can be applied to both sides of the block, and, on the other hand, the air can escape, almost without hindrance, from the material during the whole period of compression until the extreme final pressure is applied. The mold 1 can be urged forward over the counter-stamp 3 by means of any suitable mechanism (not shown) or may be urged forward simply by means of the pressure on the inner walls by the material which is being pressed forward by the pressing-stamp 2.

Considering that the greatest pressure applied is very rarely less than eight hundred atmospheres and generally about two thousand atmospheres, by means of this process a block can be produced which, practically speaking, is uniformly compact and firm throughout—that is, one which has no so-called "neutral-pressure" zone, provided, of course, that the quantity of material (height of the block) is duly regulated in accordance with the nature of such material.

The importance of the novel effect obtained by this process may be inferred from the fact that the block which has just left the press can be at once exposed to the greatest heat without any fear of its coming apart.

In most cases it is necessary that the blocks before being employed for metallurgical purposes should be exposed to the drying and chemical action of products of combustion, whereby chemical changes and combinations arise in the material and affect the physical and chemical properties of the blocks in a manner which is favorable to the purpose for which they are applied.

The chemical action manifests itself on the one hand by producing carbonates of the metalloid bases that may be present through the quantity of carbonic acid contained in the combustion products, which combinations, for the most part insoluble in water and only decomposable at high temperature, impart to the blocks corresponding and necessary properties for the purposes of metallurgy and of transport—that is to say, act as a very suitable binding medium—which in consequence of the great porousness of the blocks permeates them to a certain extent.

What I claim, and desire to secure by Letters Patent of the United States, is—

1. The method of rendering material capable of use for metallurgical purposes suitable therefor by converting it into blocks by means of pressure and the exposure of the blocks to the action of combustion gases containing carbon, which consists in subjecting the material, which may be in a finely-granulous form or in certain cases in the form of powder to a pressure increasing gradually to a very high degree (for example one thousand to two thousand atmospheres,) so that the air entirely escapes from the material during the pressing operation, and the pressure is only carried at the last stage to such a degree as to render the material plastic, whereupon, for the purpose of increasing their firmness, the blocks are exposed for a short time to the action of combustion products containing carbon at a temperature which prevents any fritting.

2. A process for the manufacture of bricks or blocks of ores for metallurgical treatment without the use of a binding material, which consists in subjecting the ores in a dry or slightly-dampened condition to a pressure of at least eight hundred atmospheres up to two thousand atmospheres in such a manner that the pressure is gradually increased for the purpose of letting the air completely escape so that the high pressure at which the material becomes plastic will only be applied at the last stage of the pressing process, whereupon the briquets or blocks are further subjected to the action of carbonic-acid gas.

3. The method of rendering material capable of use for metallurgical purposes suitable therefor by converting it into blocks by means of pressure, which consists in subjecting the material, which may be in a fine-granulous form or in certain cases in the form of powder to a pressure increasing gradually to a very high degree (for example one thousand to two thousand atmospheres,) so that the air entirely escapes from the material during the pressing operation, and the pressure is only carried at the last stage to such a degree as to render the material plastic.

4. A process for the manufacture of bricks or blocks of ores for metallugrical treatment without the use of a binding material, which consists in subjecting the ores in a dry or slightly dampened condition to a pressure of at least eight hundred atmospheres up to two thousand atmospheres in such a manner that the pressure is gradually increased for the purpose of letting the air completely escape so that the high pressure at which the material becomes plastic will only be applied at the last stage of the pressing process.

In testimony whereof I have signed my name to this specification in the presence of two subscribing witnesses.

ÁRPÁD RÓNAY.

Witnesses:—
ERNST ENTENMANN,
WM. HAHN.